(12) United States Patent
Lee et al.

(10) Patent No.: US 8,527,791 B2
(45) Date of Patent: Sep. 3, 2013

(54) PORTABLE DEVICE CAPABLE OF EXTENDING AVAILABLE BATTERY TIME AND METHOD FOR CONTROLLING PORTABLE DEVICE

(75) Inventors: Seongsoo Lee, Seoul (KR); Yongju Jang, Suwon (KR); Hyeoncheol Yang, Incheon (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 330 days.

(21) Appl. No.: 12/980,003

(22) Filed: Dec. 28, 2010

(65) Prior Publication Data

US 2012/0131362 A1    May 24, 2012

(30) Foreign Application Priority Data

Nov. 22, 2010    (KR) .................. 10-2010-0116316

(51) Int. Cl.
*G06F 1/26*    (2006.01)
*G06F 1/30*    (2006.01)

(52) U.S. Cl.
USPC ............ 713/320; 713/300; 713/323; 713/340

(58) Field of Classification Search
USPC ................... 713/300, 320, 323, 340
See application file for complete search history.

(56) References Cited

U.S. PATENT DOCUMENTS

| | | | |
|---|---|---|---|
| 7,036,034 B2* | 4/2006 | Kobayashi et al. | 713/340 |
| 7,484,110 B2* | 1/2009 | Stufflebeam | 713/300 |
| RE42,079 E * | 1/2011 | Tate et al. | 713/324 |
| 2007/0226527 A1* | 9/2007 | Ang | 713/320 |
| 2008/0055311 A1* | 3/2008 | Aleksic et al. | 345/428 |
| 2008/0212884 A1* | 9/2008 | Oneda et al. | 382/232 |
| 2009/0254772 A1* | 10/2009 | Cagno et al. | 713/340 |
| 2010/0321647 A1* | 12/2010 | Schuler et al. | 353/121 |
| 2011/0264761 A1* | 10/2011 | Mika et al. | 709/217 |
| 2011/0268000 A1* | 11/2011 | Kashikar et al. | 370/311 |

FOREIGN PATENT DOCUMENTS

KR    10-2006-0104386 A    10/2006

OTHER PUBLICATIONS

Kim, Ji-Sung et al., "Dynamic Task Scheduling Mechanism Guaranteeing the Residual Time of Battery," NuriMedia Co., Ltd., vol. 31, No. 2, pp. 565-567.

* cited by examiner

*Primary Examiner* — Vincent Tran
(74) *Attorney, Agent, or Firm* — Edwards Wildman Palmer LLP

(57) ABSTRACT

Disclosed are a battery power control device, a portable device and a method of controlling the portable device. The disclosed portable device includes a workload calculator which calculates a workload necessary to provide the specific service to the user according to at least one of time request information related to a desired time during which the specific service is provided to the user and QoS (Quality of Service) request information related to a quality of the specific service, the necessary workload being smaller than a default workload that is preset for providing the specific service; a task performer which performs a task for providing the specific service according to the necessary workload during a time that is reduced to be shorter than a task performance time according to the default workload and stop the task performance during the reduced time; and a battery unit which supplies a power for performing the task to the task performer.

9 Claims, 13 Drawing Sheets

FIG. 3

| Active time (s) | Sleep time (s) | Sleep rate | Overall operation time (s) | Effective transmission time (s) | Improvement rate (%) |
|---|---|---|---|---|---|
| 2.5 | 0 | 0.00 | 0.00 | 2519.0 | - |
| 2.5 | 0.5 | 0.17 | 0.17 | 2957.5 | 17.408 |
| 2.5 | 1 | 0.29 | 0.29 | 4765.0 | 89.162 |
| 2.5 | 1.5 | 0.375 | 0.375 | 4698.1 | 86.508 |
| 2.5 | 2 | 0.444 | 0.444 | 5337.2 | 111.879 |
| 2.5 | 2.5 | 0.5 | 0.5 | 6251.5 | 148.174 |
| 2.5 | 5 | 0.668 | 0.668 | 9628.3 | 282.228 |
| 2.5 | 10 | 0.8 | 0.8 | 25638.8 | 913.847 |

FIG. 4

| Active:Sleep ratio | Effective transmission time (s) | Improvement rate (%) | Bitrate (bps) |
|---|---|---|---|
| 10:0 | 2567 | 100 | 192000 |
| 9.5:0.5 | 2478 | 96.55 | 182400 |
| 9:1 | 3396 | 132.32 | 172800 |
| 8.5:1.5 | 4161 | 160.94 | 163200 |
| 8:2 | 4989 | 194.37 | 153600 |
| 7.5:2.5 | 5653 | 220.21 | 144000 |
| 7:3 | 6622 | 257.98 | 134400 |
| 6.5:3.5 | 8155 | 317.69 | 124800 |
| 6:4 | 10224 | 398.33 | 115200 |
| 5.5:4.5 | 11732 | 457.06 | 105600 |
| 5:5 | 15017 | 585.03 | 96000 |
| 4.5:5.5 | 18321 | 713.77 | 86400 |
| 4:6 | 26584 | 1035.65 | 76800 |
| 3.5:6.5 | 32483 | 1264.28 | 67200 |
| 3:7 | 56322 | 2194.19 | 57600 |
| 2.5:7.5 | 80075 | 3119.58 | 48000 |

US 8,527,791 B2

PORTABLE DEVICE CAPABLE OF EXTENDING AVAILABLE BATTERY TIME AND METHOD FOR CONTROLLING PORTABLE DEVICE

CROSS-REFERENCE TO RELATED APPLICATIONS

This application claims priority to Korean Patent Application No. 2010-0116316 filed on Nov. 22, 2010, the entire contents of which are incorporated herein by reference.

FIELD OF THE INVENTION

The exemplary embodiments relate to a battery power control device, a portable device and a method of controlling the portable device and, more particularly, to a battery power control device capable of assuring the satisfactory quality of service (QoS) and the sufficient battery available time (battery power); and a portable device including the battery power control device and a method for controlling the portable device.

BACKGROUND OF THE INVENTION

With the increasing use of portable device such as smart phones, tablet PCs, laptop computers, portable multimedia players and the like, the battery available time of the portable devicees as well as their performance ability has been emerging as a major issue lately. In other words, since the portable device has a difficulty in being equipped with a large amount of batteries due to their portability, it has become required to develop a technique for extending the battery available time of the portable device.

There has suggested a conventional method for extending the battery available time by using the dynamic voltage scaling (DVS). The DVS is a method of varying by the software control an operation frequency and a supply voltage supplied to the processor equipped in a portable device.

However, the conventional method using the DVS is disadvantageous in that it is possible to use a portable device equipped with a processor supporting the DVS only and it is necessary to include additional units such as a DC-DC converter, a frequency synthesizer and the like, causing additional power consumption and time delay. Further, it is not an efficient work to reduce the voltage supplied to the processor even in consideration of a battery discharge structure.

SUMMARY OF THE INVENTION

In view of the above, the present embodiments provide a battery power control device, a portable device and a method for controlling the portable device, capable of extending a battery available time without employing an additional device.

The present embodiments also provide a battery power control device, a portable device and a method for controlling the portable device, capable of assuring a satisfactory quality of service and a sufficient battery available time.

Further, the present embodiments provide a battery power control device, a portable device and a method for controlling the portable device, capable of extending an available time (remaining power capacity) of its battery in consideration of chemical properties of the battery and taskal properties of its system.

In accordance with an aspect of the present invention, there is provided a portable device for providing a specific service to a user. The portable device includes a workload calculator configured to calculate a workload that is necessary to provide the specific service to the user according to at least one of a time request information related to a desired time during which the specific service is provided to the user and a QoS (Quality of Service) request information related to a quality of the specific service, the necessary workload being smaller than a default workload that is preset for providing the specific service; a task performer configured to perform a task for providing the specific service according to the necessary workload during a time that is reduced to be shorter than a task performance time according to the default workload and stop the task performance during the reduced time; and a battery unit configured to supply a power for performing the task to the task performer.

In accordance with another aspect of the present invention, there is provided a method for controlling a portable device including a battery unit, the portable device serving to provide a specific service to a user. The method includes calculating a workload that is necessary to provide the specific service to the user according to at least one of a time request information related to a desired time during which the specific service is provided to the user and a QoS request information related to a quality of the specific service, the necessary workload being smaller than a default workload that is preset for providing the specific service; and performing a task for providing the specific service according to the necessary workload during a time that is reduced to be shorter than a task performance time according to the default workload and stopping the task performance during the reduced time.

In accordance with still another aspect of the present invention, there is provided a device for controlling a power of a battery included in a service providing device for providing a specific device to a user. The device includes a workload calculator configured to calculate a workload that is necessary to provide the specific service to the user according to at least one of a time request information related to a desired time during which the specific service is provided to the user and a QoS request information related to a quality of the specific service, wherein the necessary workload is smaller than a default workload that is preset for providing the specific service.

BRIEF DESCRIPTION OF THE DRAWINGS

The objects and features of the present invention will become apparent from the following description of embodiments, given in conjunction with the accompanying drawings, in which:

FIGS. 3 to 12 show results of simulations performed to explain an effect in which a remaining available time of a battery is increased by adjusting a bitrate when a video is transferred from a portable device.

DETAILED DESCRIPTION OF THE EMBODIMENTS

Exemplary embodiments of the present invention will now be described in detail with reference to the accompanying drawings which form a part hereof.

Figure 1:
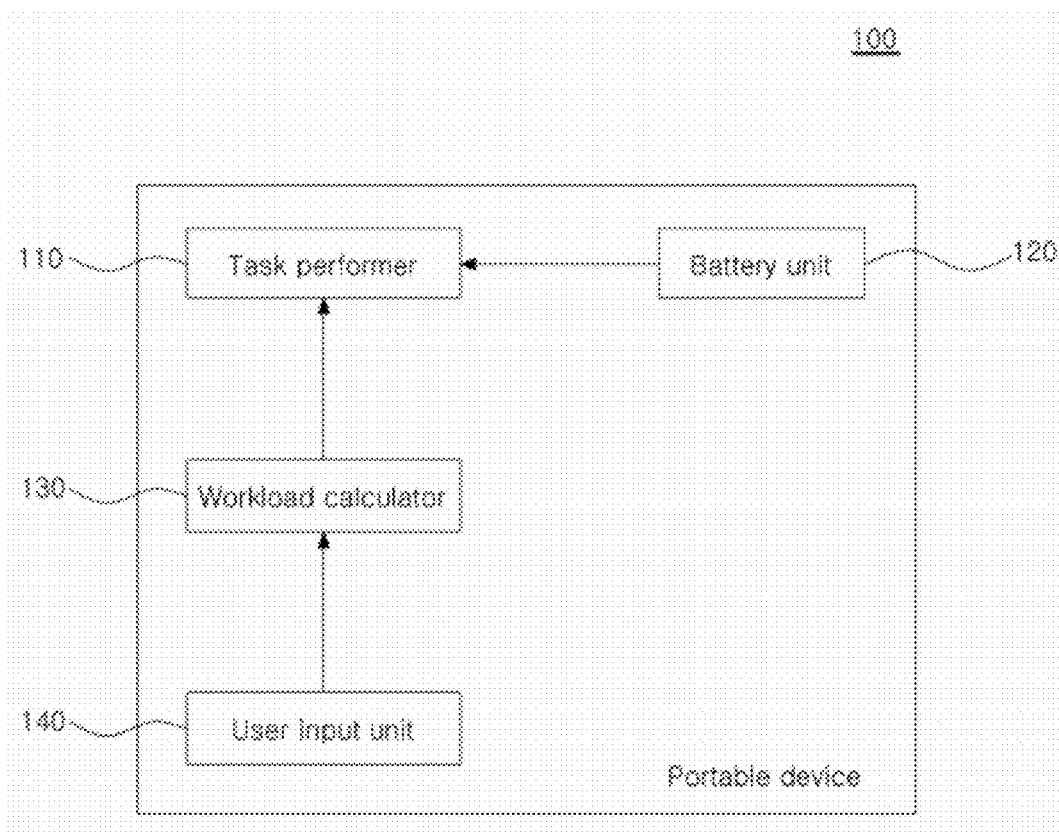
FIG. 1 is a block diagram showing a structure of a portable device in accordance with a first exemplary embodiment.

FIG. 1 is a block diagram showing a structure of a portable device 100 in accordance with a first exemplary embodiment.

As shown in FIG. 1, the portable device 100 of the present embodiment, which is a device for providing a specific service to a user, may include a task performer 110; a battery unit 120; a workload calculator 130; and a user input unit 140, functions of which will be described below per unit.

The task performer 110 may perform a task for providing a specific service to a user. Here, the specific service may include all services, including playback of music and video, playing of video game, transmission of video to the outside, and the like, which are available in portable devices. For example, in case that the specific service is relative to the transmission of a video to the outside, what is performed by the task performer 110 may be relative to an operation of transmitting, e.g., a coded video to the outside by using a wireless communications device.

The battery unit 120 may supply to the task performer 110 a power required to perform a task. Here, the battery unit 120 may include various kinds of batteries such as Li—Mn batteries, Li-ion batteries, Ni-MH batteries, Ni—Cd batteries and the like.

Generally, a battery generates an electric power by converting a chemical energy of an active material to an electric energy through the electrochemical oxidation-reduction reaction (that is, producing an electric energy by the movement of electrons which is caused by the reaction of electrolyte between an anode electrode and a cathode electrode). In this case, the electrochemical oxidation-reduction reaction is performed at an electrolyte closer to the electrode, and electrons are transferred to the reacted electrolyte from an electrolyte that is spaced away from the electrode. At this time, if there occurs an idle time at which the supply of a power is stopped while the power is supplied from the battery, this may help the electrons to be stably transferred from the electrolyte spaced away from the electrode to electrolyte closer to the electrode, thereby increasing the remaining battery capacity. This is referred to as "recovery effect" of battery.

Accordingly, in accordance with the present embodiment, the battery unit 120 may increase its battery remaining capacity by the recovery effect in case that there occurs a point of time when the task performed by the task performer 110 is stopped.

The workload calculator 130 may calculate a workload that is necessary to provide a specific service and transmits the calculated workload to the task performer 110. If receiving information related to the calculated workload therefrom, the task performer 110 may perform a corresponding task based on the workload. In other words, the task performer 110 may perform the task based on a default workload in the case of receiving no information related to a workload from the workload calculator 130 or based on the workload calculated by the workload calculator 130 in the case of receiving the calculated workload from the workload calculator 130.

The user input unit 140 may receive at least one of request information (time request information) related to a desired time during which a specific service is provided to a user and request information (QoS request information) related to a quality of service (QoS) of the specific service.

If at least one of the time request information and the QoS request information is received through the user input unit 140, the workload calculator 130 may calculate a workload required (necessary) to provide the specific service to the user based on the received request information. In other words, if the providing time request information and/or the QoS request information are received, the workload calculator 130 may adjust an amount of the task to be performed by the task performer 110 to not only satisfy the request information but also provide the specific service to the user.

Meanwhile, as described above, the remaining capacity of the battery unit 120 may be increased by the recovery effect. Accordingly, in accordance with the present embodiment, the workload calculator 130 may calculate a workload that is smaller than a default workload pre-set to provide the specific service as a target workload for the specific service and transmit it to the task performer 110 in order to increase the remaining capacity of the battery unit 120.

Specifically, in case that the workload that is necessary to provide the specific service is smaller than the default workload, a task performance time of the task performer 110 based on the necessary workload may be reduced to be shorter than that based on the default workload and, thus, the task performer 110 may stop the task performance during the reduced performance time, which causes the battery unit 120 not to supply the power to the task performer 110 during the reduced performance time (i.e., the idle time). Accordingly, the remaining capacity of the battery unit 120 may be increased by the recovery effect from the time when the task performer 110 stops the task performance.

For example, the task performer 110 may perform a corresponding task per preset task performance unit for a specific service (in case that the specific service is relative to the transmission of a video, the task performer 110 may transmit the video in a unit of group of picture (GOP)). In this case, the task performer 110 may perform the task with as much as the reduced workload by repeatedly performing the task and stopping the task performance per task performance unit to provide the specific service, and the remaining capacity of the battery unit 120 may be increased by the recovery effect whenever the task performance is stopped.

As such, the portable device 100 of the present embodiment may adequately adjust (reduce) the workload of the task performed by the task performer 110 according to a user request (relative to an available time and quality of service) and increase the remaining capacity of the battery unit 120 through the battery chemical property (recovery effect) by using the adjusted workload, to thereby assure a satisfactory battery available time.

In the meantime, in order to calculate the necessary workload based on the request information inputted from the user, the workload calculator 130 may set up and store a relative model (or table) and calculate the necessary workload by using the stored relative model. To that end, the workload calculator 130 may include a storage unit (not shown).

In accordance with the present embodiment, the storage unit (not shown) stores at least one of a performance workload—QoS model showing a relationship between a workload (performance workload) performed to provide a specific service and a quality of the specific service (QoS) according to the performance workload; and a idle time—capacity model showing a relationship between a time (idle time) when the task performer 110 stops the task performance and an amount of the remaining capacity of the battery unit 120 that is increased by the recovery effect, and the workload calculator 130 may calculate the necessary workload by using at least one of the two models.

Since more workload typically leads to better QoS, the QoS is generally proportional to the performance workload in the performance workload—QoS model. Moreover, since more idle time typically leads to more increase of the remaining capacity of the battery unit 120, the increased amount of the remaining capacity of the battery unit 120 is proportional to the idle time in the idle time—capacity model.

The performance workload—QoS model and the idle time—capacity model may individually be created and stored depending on kinds of the services to be provided and kinds of the batteries included in the battery unit 120.

In accordance with the present embodiment, in case that the QoS request information is inputted through the user input unit 140, the workload calculator 130 may search a performance workload corresponding to the requested QoS from the performance workload—QoS model and calculate the searched performance workload as the necessary workload.

At described above, in order to guarantee the idle time, the QoS may be required to be proportional to the performance workload and the performance workload may be required to be smaller than the default workload. Accordingly, the workload calculator 130 may calculate the necessary workload only when the QoS requested by a user is lower than that in case that the task performer 110 performs the task according to the default workload.

Moreover, in accordance with another embodiment, in case that the time request information is inputted through the user input unit 140, the workload calculator 130 may calculate based on the current remaining capacity of the battery unit 120 an additional capacity of the battery unit 120 that is additionally required when the task performer 110 performs the task during the requested time. Then, the workload calculator 130 may search from the idle time—capacity model an idle time corresponding to the calculated additional capacity of the battery unit 120 and estimate a workload for obtaining the searched idle time to output the estimated workload as the necessary workload.

In this case, if an available time of the portable device 100 based on the current remaining capacity of the battery unit 120 is identical to the time requested by the user, it may becomes unnecessary to additionally increase the capacity of the battery unit 120. Accordingly, the workload calculator 130 may calculate the necessary workload only when the current remaining capacity of the battery unit 120 is larger than the estimated capacity of battery unit 120 to be consumed when the task performer 110 performs the task during the requested time.

Further, in accordance with still another embodiment, in case that both of the time request information and the QoS request information are inputted through the user input unit 140, the workload calculator 130 may accord a first priority to the requested QoS and a second priority to the requested time to calculate the necessary workload.

Specifically, the workload calculator 130 may search from the load—QoS model a performance workload corresponding to the requested QoS and, further, search from the idle time—capacity model an increased amount of the remaining capacity of the battery unit 120 corresponding to an idle time to be obtained by using the searched performance workload; and estimate an available time of the battery unit 120 by using the searched increased amount of the remaining capacity of the battery unit 120 and the current remaining capacity of the battery unit 120. Then, if the estimated available time of the battery unit 120 is equal to or larger than the requested time of the user, the workload calculator 130 may calculate the searched performance workload as the necessary workload.

If the estimated available time of the battery unit 120 is smaller than the requested time of the user, the workload calculator 130 may based on the current remaining capacity of the battery unit 120 an additional capacity of the battery unit 120 that is additionally necessary when the task performer 110 performs the task during the requested time. Then, the workload calculator 130 may search from the idle time—capacity model an idle time corresponding to the calculated additional capacity of the battery unit 120 and estimate a workload for obtaining the searched idle time to calculate the estimated workload as the necessary workload.

In briefly, in case that the necessary workload is calculated based on both of the requested time and the requested QoS, the workload calculator 130 may calculate a (minimum) workload that is enough to satisfy the requested QoS and then determine whether or not the remaining capacity of the battery unit 120 is sufficient to perform the task according to the calculated workload. Then, the workload calculator 130 may calculate the calculated workload as the necessary workload if it is determined that the remaining capacity of the battery unit 120 is sufficient. On other hand, if it is determined that the remaining capacity of the battery unit 120 is not sufficient, the workload calculator 130 may calculate a workload for obtaining the remaining capacity of the battery unit 120 that is enough to satisfy the requested time and set up the calculated workload as the necessary workload.

In the meantime, the workload calculator 130 may be embodied as an individual device for controlling the power (remaining power capacity) of the battery unit 120. That is, the workload calculator 130 may be embodied as a device, e.g., a battery power control device, separated from the portable device 100. In this case, the battery power control device may be used to control the power of a battery equipped in an electric car or a hybrid car in addition to the portable device 100. Alternatively, the battery power control device may be used to control the power of a battery equipped in a service providing device for providing a specific service to a user.

Hereinafter, an example in which a service that a portable device transmits a coded video to the outside is provided to a user will be described in more detail with reference to FIG. 2.

Figure 2:
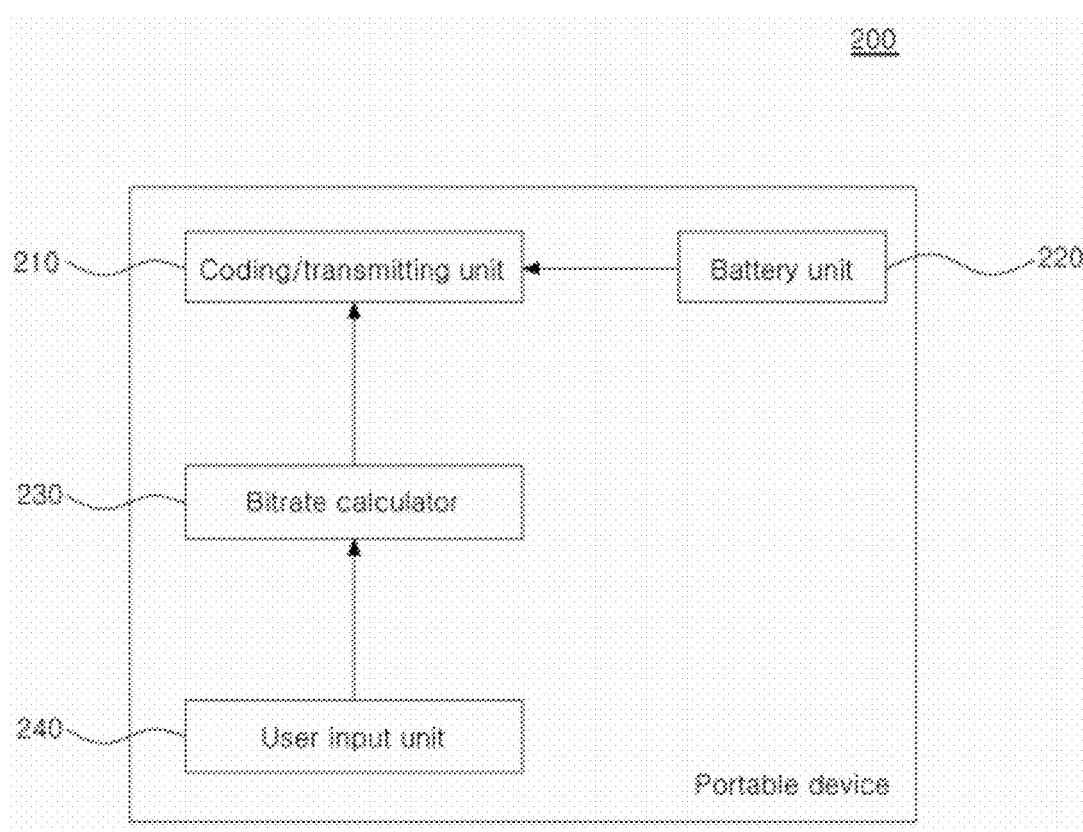
FIG. 2 is a block diagram showing a structure of a portable device in accordance with a second exemplary embodiment.

FIG. 2 is a block diagram showing a structure of a portable device 200 in accordance with a second exemplary embodiment.

Referring to FIG. 2, the portable device 200 of the present embodiment may include a coding/transmitting unit 210, a battery unit 220, a bitrate calculator 230, and a user input unit 240.

The coding/calculating unit 210, which corresponds to the task performer 110, may code a video and transmit it to the outside. To that end, the coding/calculating unit 210 may include a coder 211 for coding/compressing a video; and a transmitter 212 for transmitting a coded video to the outside.

The coder 211 may calculates a quantization parameter (QP) and codes the video based on the quantization parameter. A quantization parameter level may be determined depending on a necessary bitrate calculated by the bitrate calculator 230 to be described later. The transmitter 212 may perform the transmission in a unit of group of picture (GOP). Specifically, the transmitter 212 may transmit, e.g., a coded video to the outside by repeatedly performing and stopping the transmission per GOP unit.

The battery unit 220 may supply to the transmitter 212 a power for transmitting the coded video. Here, the task performed to provide a service in the first embodiment corresponds to the "transmission of a coded video." Of cause, the battery unit 220 may supply a power to various units, e.g., the coder 211 for compressing the coded video. However, the description that "the battery unit 220 may supply a power to the transmitter 212" is specially made in the present embodiment in order to make the explanation by mapping the "transmission of a coded video" to the "task performed to provide a service" in FIG. 1.

The bitrate calculator 230 may calculate a bitrate that is necessary for the transmission of the coded video and output it to the coding/transmitting unit 210. Here, the "bitrate" in the present embodiment corresponds to the "workload" described with reference to FIG. 1.

Accordingly, in the case of receiving no information related to the bitrate from the bitrate calculator 230, the coding/transmitting unit 210 may set up a QP according to a predetermined default bitrate and compress the video based on the QP to transmit the compressed video. On the contrary, in the case of receiving information related to the bitrate from the bitrate calculator 230, the coding/transmitting unit 210 may set up a QP according to the calculated bitrate and compress the video based on the QP to transmit the compressed video.

The user input unit 240 may receive from a user at least one of request information (time request information) relative to a desired time during which a coded video is transmitted; and request information (QoS request information) relative to a quality of service (QoS) of the transmission of the video. At this time, the QoS information may include a pick signal to noise ratio (PSNR) of the coded video. Hereinafter, for the convenience of description, the QoS request information is referred to as "PSNR request information" in the present embodiment.

If at least one of the time request information and the PSNR request information is inputted through the user input unit 240, the bitrate calculator 230 may calculate a bitrate that is necessary for the transmission of the video according to at least one of the time request information and the PSNR request information.

Meanwhile, in order to calculate the necessary bitrate based on the request information, the bitrate calculator 230 may store in a storage unit 231 at least one of a bitrate—PSNR model showing a relationship between a bitrate when a coded video is transmitted and a PSNR according to the bitrate; and a idle time—capacity model showing a relationship between a time (idle time) at which the transmitter 212 stops transmitting the coded video and an amount of the remaining capacity of the battery unit 220 that is increased according to the recovery effect. Then, the bitrate calculator 230 may calculate the necessary bitrate by using the two models. In general, the bitrate may be proportional to the PSNR, and the increased amount thereof may be proportional to the idle time.

The bitrate—PSNR model and the idle time—capacity model may individually be created and stored depending on kinds of standard videos such as "foreman," "bridge_far" and the like and kinds of the batteries included in the battery unit 220.

In accordance with the present embodiment, in case that the PSNR request information is inputted through the user input unit 240, the bitrate calculator 230 may search a bitrate corresponding to the requested PSNR from the bitrate—PSNR model and calculate the searched bitrate as the necessary bitrate.

Moreover, in accordance with another embodiment, in case that the time request information is inputted through the user input unit 240, the bitrate calculator 230 may calculate based on the current remaining capacity of the battery unit 220 an additional capacity of the battery unit 220 that is additionally necessary when the transmitter 212 transmits the video during the requested time. Then, the bitrate calculator 230 may search from the idle time—capacity model an idle time corresponding to the calculated additional capacity of the battery unit 220 and estimate a bitrate for obtaining the searched idle time to calculate the estimated bitrate as the necessary bitrate.

Further, in accordance with still another embodiment, in case that both of the time request information and the PSNR request information are inputted through the user input unit 240, the bitrate calculator 230 may search from the bitrate—PSNR model a bitrate corresponding to the requested PSNR and, further, search from the idle time—capacity model an increased amount of the remaining capacity of the battery unit 220 corresponding to an idle time to be obtained by using the searched bitrate; and estimate an available time of the battery unit 220 by using the searched increased amount of the remaining capacity of the battery unit 220 and the current remaining capacity of the battery unit 220. Then, if the estimated available time of the battery unit 220 is equal to or larger than the requested time of the user, the bitrate calculator 230 may calculate the searched bitrate as the necessary bitrate.

If the estimated available time of the battery unit 220 is smaller than the requested time of the user, the bitrate calculator 230 may based on the current remaining capacity of the battery unit 220 an additional capacity of the battery unit 220 that is additionally necessary when the transmitter 212 performs the task during the requested time. Then, the bitrate calculator 230 may search from the idle time—capacity model an idle time corresponding to the calculated additional capacity of the battery unit 220 and estimate a bitrate for obtaining the searched idle time to calculate the estimated bitrate as the necessary bitrate.

Hereinafter, an effect in which a remaining available time of the battery unit 220 is increased by adjusting the bitrate when the video is transmitted in the portable device 200 in accordance with the second embodiment will be described with reference to FIGS. 3 to 10.

FIGS. 3 to 10 show results of simulations performed to explain an effect in which the remaining available time of the battery unit 220 is increased by adjusting the bitrate when the video is transmitted in the portable device 200.

Specifically, FIGS. 3 to 10 show results of simulations performed on a "foreman" standard video and a "bridge_far" standard video in the case of receiving from a user PSNR request information for reducing the PSNR (i.e., quality of service) by 1 dB based on the case that a coded video is transmitted according to the default bitrate.

First, FIG. 3 shows how a battery available time is changed according to an idle time in case that video data is transmitted through a device Kmote-s1. In the ubiquitous sensor network (USN), the portable device 200 is constituted by attaching a battery of 3.0 V Li/MnO2 to the device Kmote-s1 serving as test equipment. At this time, the ratio between an active mode where a video is transmitted and a sleep mode where the transmission of the video is stopped was set for the simulation as shown in the following table 1.

TABLE 1

| Active mode | 2.5 | 2.5 | 2.5 | 2.5 | 2.5 | 2.5 | 2.5 | 2.5 |
|---|---|---|---|---|---|---|---|---|
| Sleep mode | 0 | 0.5 | 1 | 1.5 | 2 | 2.5 | 5 | 10 |

Based on the ratio between the active mode and the sleep mode according to Table 1, an initial voltage of the battery unit 220 was set to 3.0 V and the time during which the voltage of the battery unit 220 is reduced to 2.0 V was measured. In this case, the relationship between an idle time and an increased amount of the battery remaining capacity was obtained as shown in FIG. 3.

In Table 1, the sleep ratio indicates "(sleep time)/(active time+sleep period), and the improvement rate serves as an increased amount of the remaining capacity of the battery unit 220, which is obtained by "overall battery operation time× sleep ratio." Besides, the effective available time indicates the available time of the portable device 200 according to the increase in the remaining capacity of the battery unit 220.

Referring to FIG. 3, when the sleep ratio is 0.2, it can be checked that the lifespan of the battery unit 220 is expanded to about 10 times.

Next, FIG. 4 shows how an effective available time is changed according to the ratio between the active time and the sleep time.

The video conformed to a video standard of quarter common intermediate format and had 30 frames per second, and each frame had three GOPs. Further, ten slices (IPPPPPP-PPP) were included per GOP. In this simulation, the result is obtained as shown in FIG. 4.

Since it is possible to transmit data at a maximum bitrate of 250 Kbps by the frequency band of 2.4 GHz through the device Kmote-s1 using the Zigbee communications, the coder 211 may encode a video by adjusting the QP in a constant bitrate (CBR) of 192 Kbps or less.

In the meantime, the target bitrate may be obtained by multiplying the default bitrate (192 Kbps) by an optimized sleep rate as in the following Eq. 1. In this case, periods of the active mode and the sleep mode of the device Kmore-s1 are set according to the bitrate of a video, and an active time and an sleep time of the highest recovery effect of the battery unit 220 are detected by varying the active time and the sleep time at the set periods. Then, the optimized sleep rate is obtained by using the detected active time and sleep time.

$$\text{Target Bitrate} = \frac{\text{Active Time}}{\text{Active Time} + \text{Sleep Time}} \times 192 \text{ Kbps} \quad [\text{Eq. 1}]$$

Referring to FIG. 4, in case that a pattern period of the intermittent discharge property is set to be ⅓ seconds, it can be checked that the available time gain of the battery unit 220 of up to 3119% at the maximum is obtained.

Figure 5:
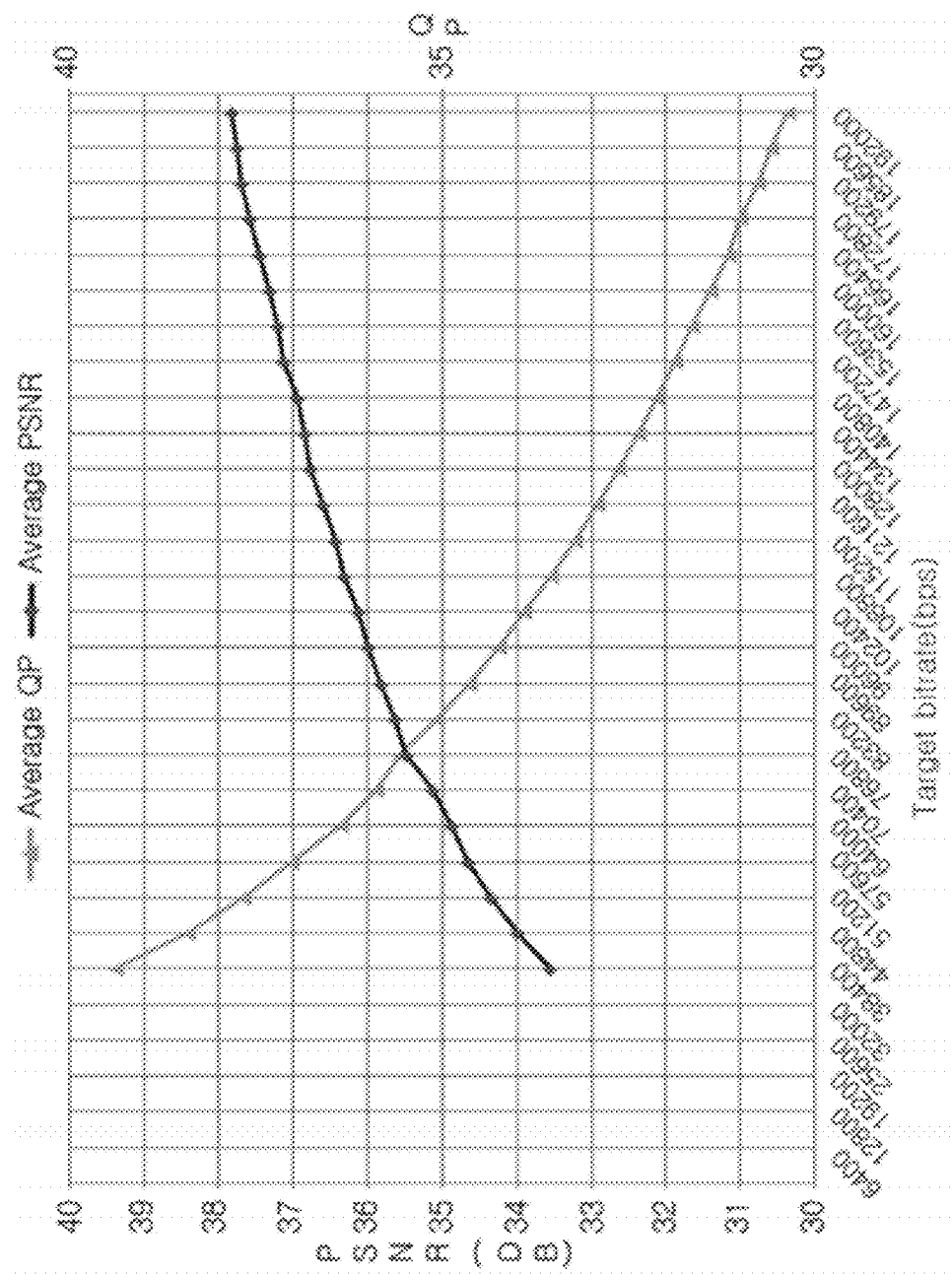
Figure 6:
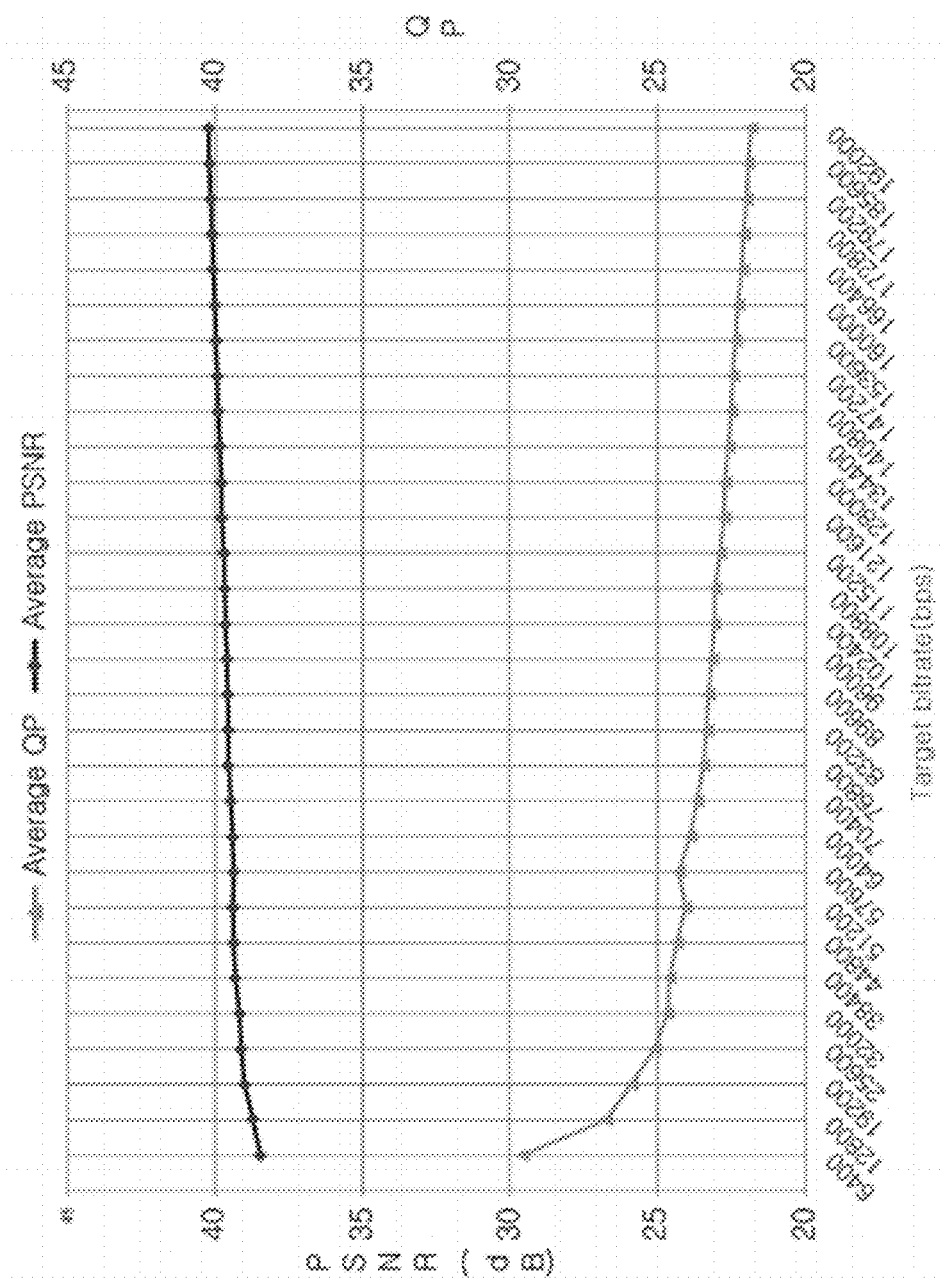

Next, FIGS. 5 and 6 show a relationship between the QP and the PSNR according to the change in the target bitrates of the "foreman" standard video and the "bridge_far" standard video.

Referring to FIGS. 5 and 6, it can be checked that the change in the PSNR that is caused by the QP changed by the change in the target bitrates becomes different according to kinds of the standard videos. That is, it can be checked that the PSNR is largely changed according to the change of the QP of the "foreman" standard video having much movement (FIG. 5) and is not largely changed according to the change of the QP of the "bridge_far" standard video having less movement (FIG. 6).

Figure 7:
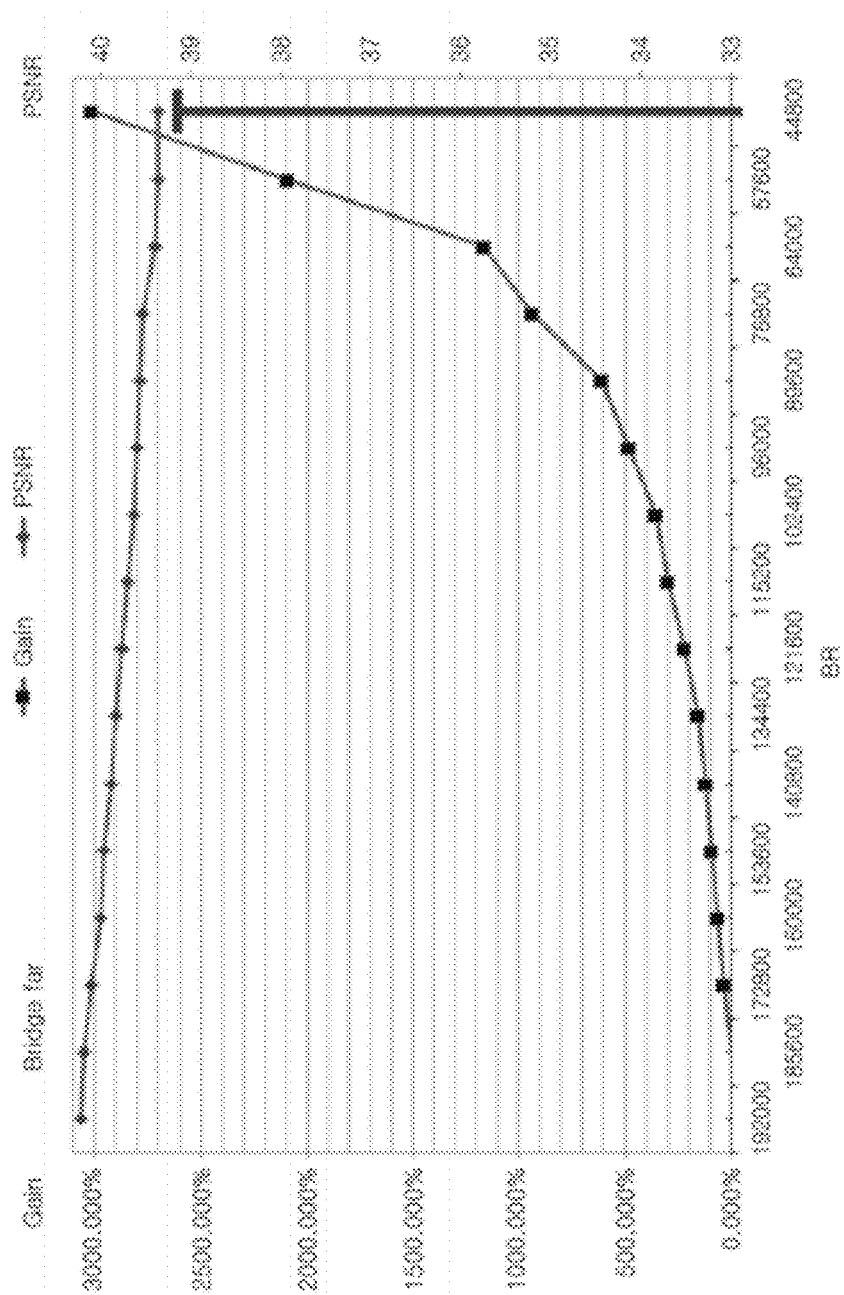
Figure 8:
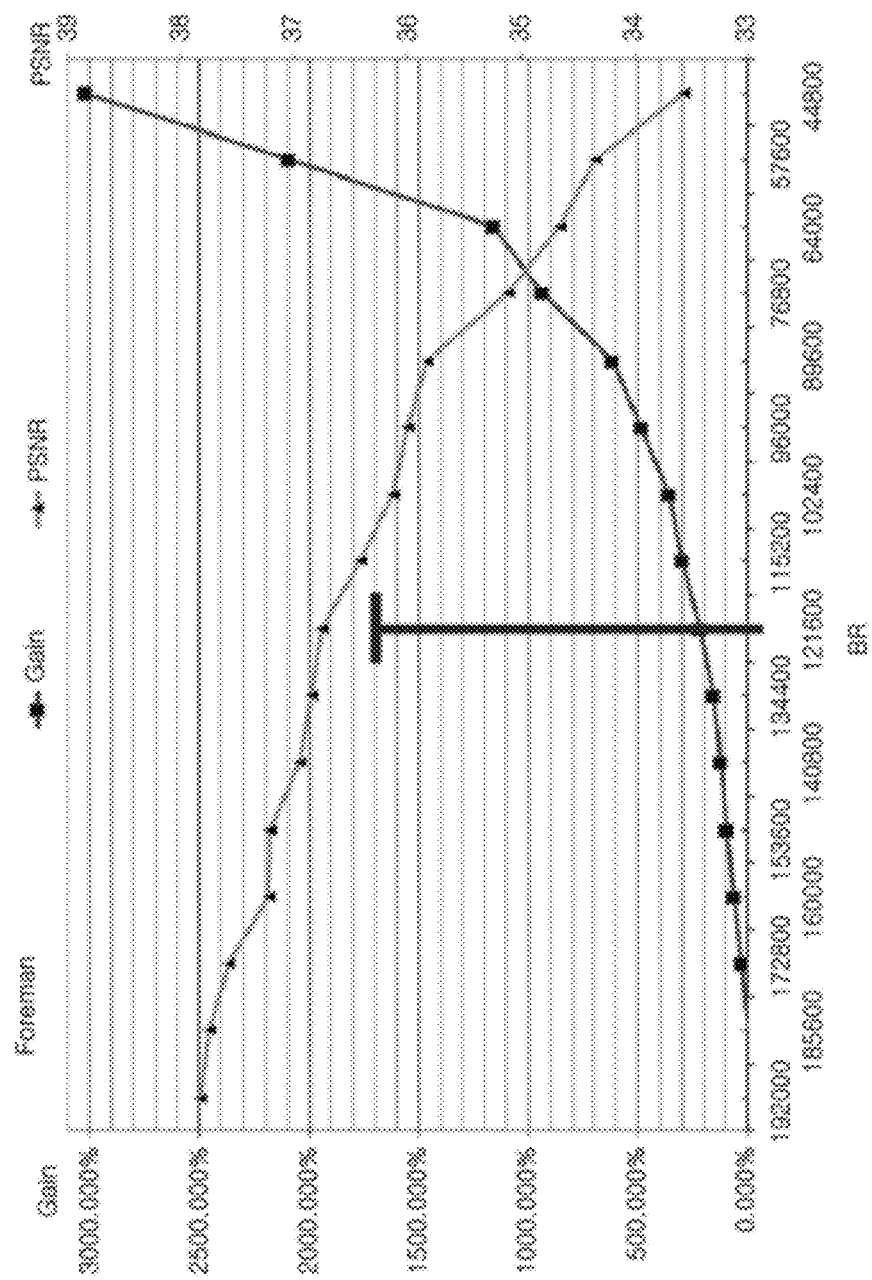

Successively, FIGS. 7 and 8 show a relationship between the available time gain of the battery unit 220 and the PSNR according to the bitrates of the "foreman" standard video and the "bridge_far" standard video.

In the case of the "bridge_far" standard, as shown in FIG. 7, the PSNR is reduced by 1 dB at a portion of 64 Kbps (⅓ of 192 Kbps). Accordingly, in case that the active/sleep ratio of the discharge pattern of the battery unit 220 is set to be 0.5, it is possible to obtain the available time gain of the battery unit 220 up to about 3100%. Moreover, in the case of the "foreman" standard video," as shown in FIG. 8, if the PSNR is reduced by 1 dB, the effective available time of the battery unit 220 can be set to be 0.8. Accordingly, it is possible to obtain the available time gain of the battery unit 220 up to about 194%.

Figure 9:
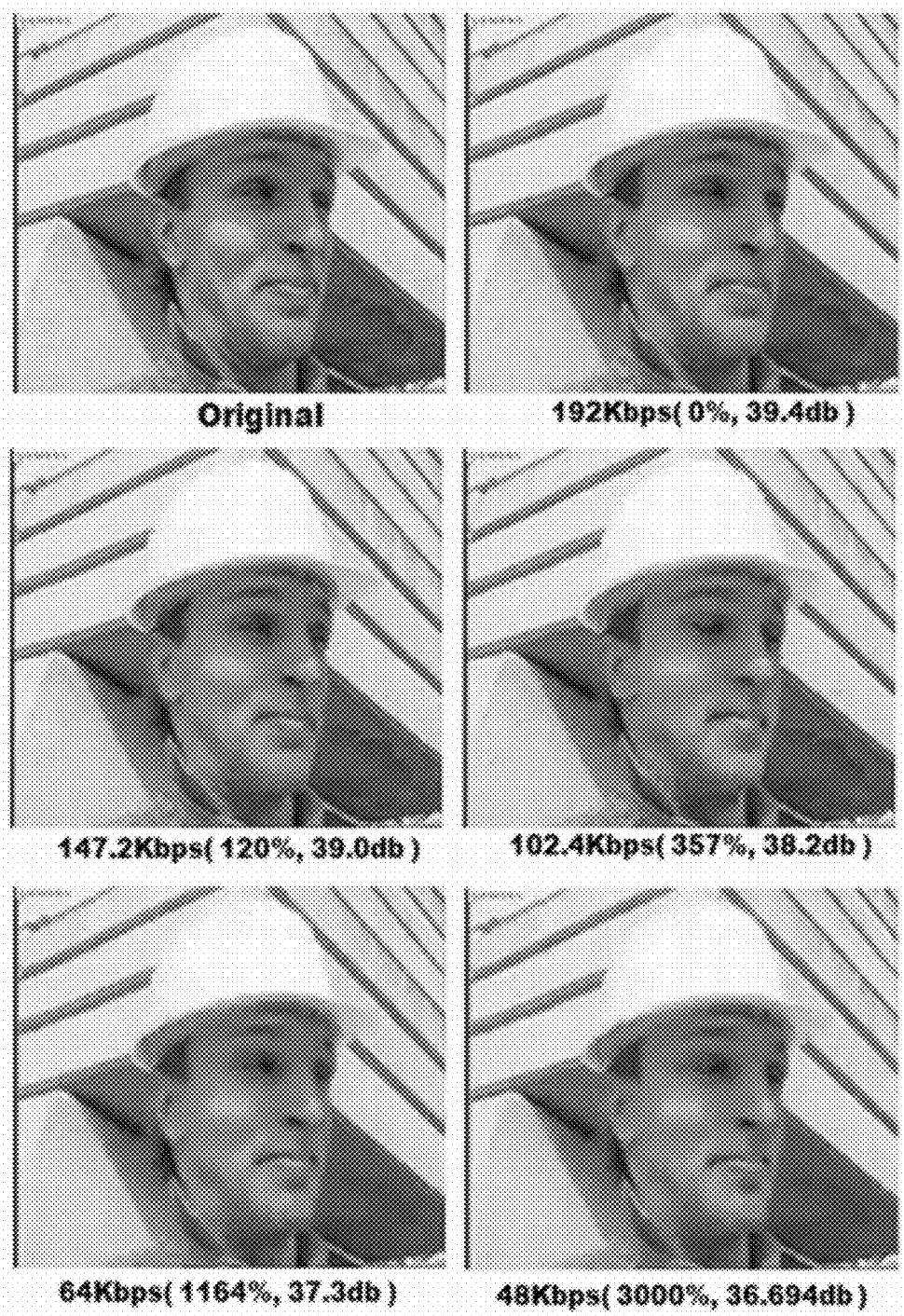
Figure 10:
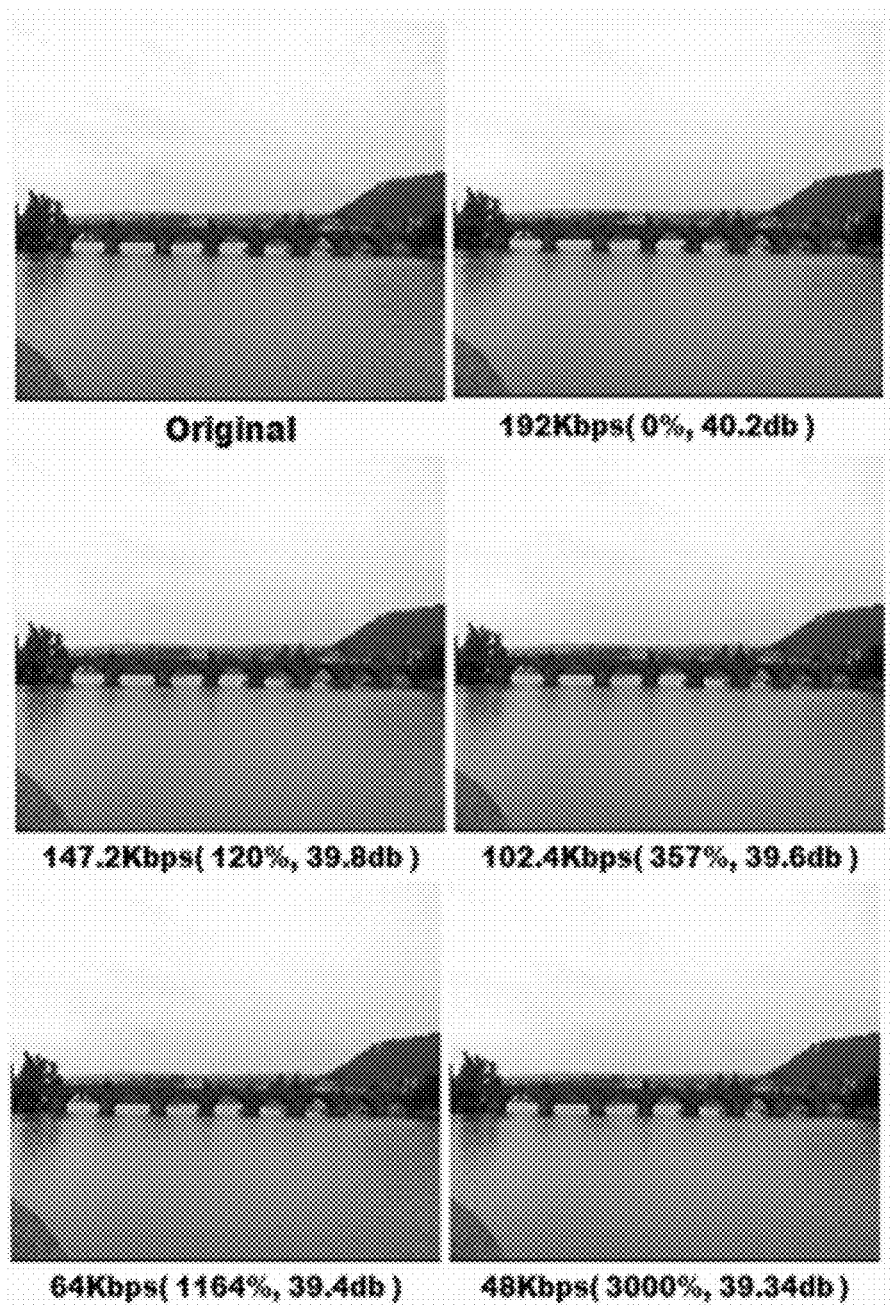

FIGS. 9 and 10 show the QoS (dB) and corresponding available time gain (%) of the "bridge_far" standard (FIG. 7) and the "foreman" standard video (FIG. 8) in case that the bitrate is changed from 192 Kbps to 48 Kbps as in the above.

Meanwhile, since it is not easy to recognize the difference with a naked eye in case that the PSNR is reduced by 1 dB in the QCIF video standard. Accordingly, such reduction of the PSNR by 1 dB may not have a significant effect on the QoS when the video is transmitted.

Figure 11:
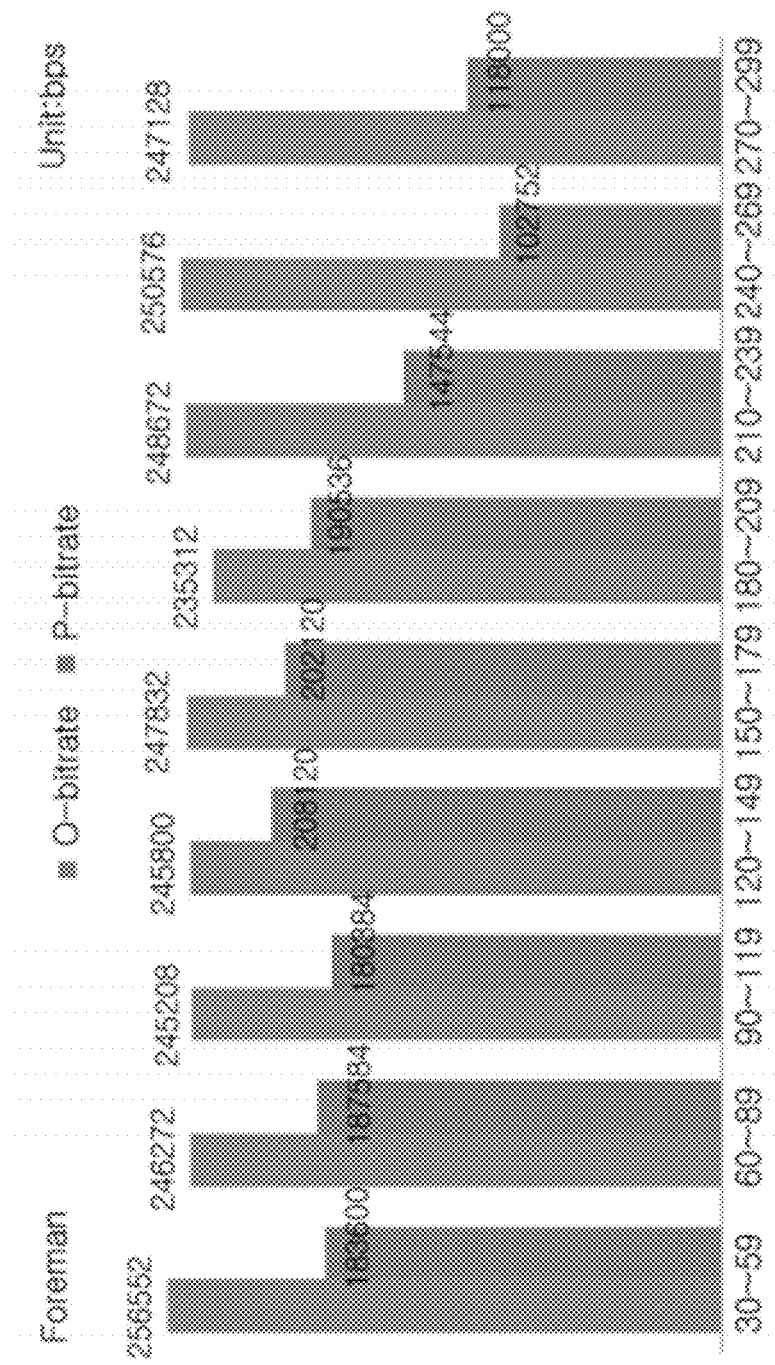
Figure 12:
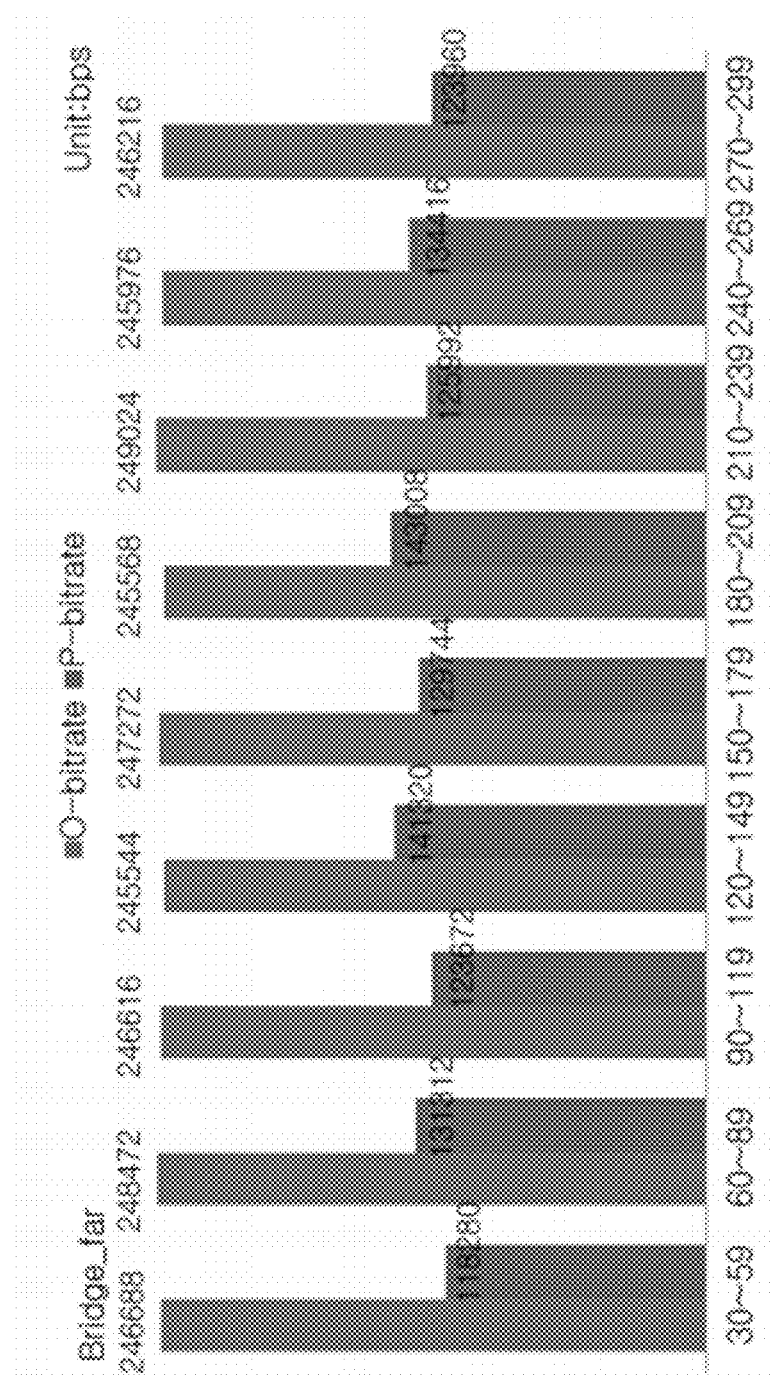

FIGS. 11 and 12 show the bitrates of the "foreman" standard video and the "bridge_far" standard video in case that, in the aforementioned simulation, instead of the case that the pattern period of the intermittent discharge property is set to be ⅓ seconds, the ratio between the active mode and the sleep mode is determined in a unit of 30 frames per second; the maximum bitrate of the zigbee wireless communications per second is set to be 250 Kbps; and the remaining time after the video whose PSNR is reduced by 1 dB is transmitted is determined as the sleep time.

In FIGS. 11 and 12, left bars (O-bitrate) indicate the bitrates in the case of encoding the video according to the bitrate of 250 Kbps, and right bars (P-bitrate) indicate the bitrates in the case that the PSRN is reduced by 1 dB. In the meantime, 1 to 29 initial frames (zero second section) were omitted in the simulation since they were sections for preparing given conditions in a rate distortion optimization (RDO) block of the coder 211.

Referring to FIGS. 11 and 12, it can be checked that the "foreman" standard video having much movement has a larger change in the bitrate per second than that of the "bridge_far" standard video.

Table 2 shows a ratio between the per-second-section bitrate of 0 to 299 frames and the "foreman" standard video and the "bridge_far" standard video, and Table 3 shows a used time of the battery unit 220 when each standard video is transmitted. Here, avg BR, avg LT and avg gain respectively indicate an average bitrate, an average used time of the battery unit 220 and an average available time gain of the battery unit 220.

TABLE 2

| Frame Range | "foreman" | | | "bridge_far" | | |
| --- | --- | --- | --- | --- | --- | --- |
| | O-bitrate | P-bitrate | A:S ratio | O-bitrate | P-bitrate | A:S ratio |
| 30~59 | 256552 | 183600 | 72% | 246688 | 118280 | 48% |
| 60~89 | 246272 | 187584 | 76% | 248472 | 131312 | 53% |
| 90~119 | 245208 | 180384 | 74% | 246616 | 123672 | 50% |
| 120~149 | 245800 | 208120 | 85% | 245544 | 141320 | 58% |
| 150~179 | 247832 | 202120 | 82% | 247272 | 129744 | 52% |
| 180~209 | 235312 | 190536 | 81% | 245568 | 143008 | 58% |
| 210~239 | 248672 | 147544 | 59% | 249024 | 125992 | 51% |
| 240~269 | 250576 | 102752 | 41% | 245976 | 134416 | 55% |
| 270~299 | 247128 | 118000 | 48% | 246216 | 123960 | 50% |

TABLE 3

| | 250 Kbps | foreman[−1 dB] | bridge_far[−1 dB] | Unit |
| --- | --- | --- | --- | --- |
| avg BR | 249.93 | 175.76 | 133.36 | Kbps |
| avg LT | 2566 | 8098.1 | 13319.7 | sec. |
| avg gain | 100% | 316% | 519% | % |

Referring to Tables 2 and 3, it can be seen that the average bitrate of the "foreman" standard video is 175 Kbps, and the time at which the video whose PSRN is reduced by 1 dB is transmitted is averagely 8098 seconds. Moreover, it can be seen that the average bitrate of the "bridge_far" standard video is 133 Kbps, and the time during which the video whose PSRN is reduced by 1 dB is transmitted is averagely 13319 seconds. Further, it can be seen that, in the case of transmitting the video at the bitrate of 250 Kbps, the used time of the battery unit 220 is averagely 2566 seconds. Resultantly, it is possible to increase the available time of the battery unit 220 to 316 or 519% in the case of transmitting the videos whose PSNR is reduced by 1 dB as compared with the case of transmitting it at the bitrate of 250 Kbps.

As described above, the portable device 100 or 200 of the exemplary embodiments are applicable to a system that does not support the DVS function by managing the power of the portable device by use of the battery chemical property with the flexible control of the workload. Further, the portable device 100 or 200 of the exemplary embodiment is advantageous in that it is possible to assure data quality and the performance time of the portable device 100 or 200 until a specific time by controlling the battery available time or the quality of service serving as restriction conditions when the workload is reduced.

Figure 13:
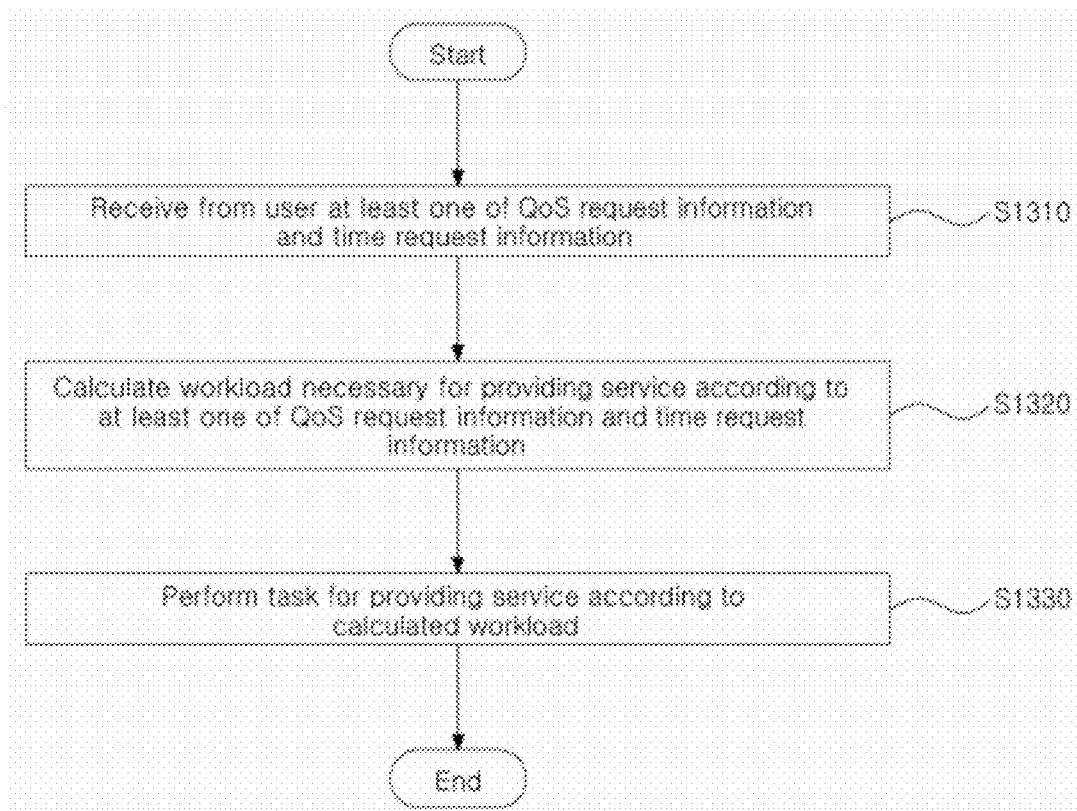
FIG. 13 is a flowchart showing a general process of a method for controlling the portable device in accordance with an exemplary embodiment.

FIG. 13 is a flowchart showing a general process of a portable device control method in accordance with an exemplary embodiment. Hereinafter, the task performed per step will be described.

First, in step S1310, at least one of request information (time request information) related to a desired time during which a specific service is provided to a user and request information (QoS request information) related to a quality of service (QoS) of the specific service is received from a user.

In step S1320, in the case of providing the specific service according to at least one of the time request information and the QoS request information, a necessary workload is calculated. At this time, the calculated workload is smaller than a default workload that is preset for providing the specific service.

In step S1330, the specific service is provided according to the calculated workload.

In this case, the performance time according to the necessary workload is reduced to be shorter than that according to the default workload, and the performance is stopped during the reduced performance time. Accordingly, the remaining capacity of the battery unit included in the portable device is increased by the recovery effect when the performance is stopped.

The structure of the portable device 100 or 200 described in the above with reference to FIGS. 1 and 2 may be applied to the portable device control method of the present embodiment and, thus, corresponding detailed description will be omitted.

It is possible to extend a battery available time without employing an additional device by using a battery power control device, a portable device and a method for controlling the portable device in accordance with the exemplary embodiments.

It is also possible to assuring a satisfactory quality of service and a sufficient battery available time by using a battery power control device, a portable device and a method for controlling the portable device in accordance with the exemplary embodiments.

The limited embodiments and drawings are only examples of the present invention, serve only for helping the present invention to be understood more generally and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A portable device for providing a specific service to a user, the portable device comprising:
    a workload calculator configured to calculate a workload that is necessary to provide the specific service to the user according to a time request information related to a desired time during which the specific service is provided to the user, the necessary workload being smaller than a default workload that is preset for providing the specific service;
    a task performer configured to perform a task for providing the specific service according to the necessary workload during a time that is reduce to be shorter than a task performance time according to the default workload and stop the task performance during the reduced time; and
    a battery unit configured to supply a power for performing the task to the task performer, wherein a remaining capacity of the battery unit is increased due to a recovery effect from a time when the task performer stops the task performance,
    wherein the workload calculator comprises a storage unit storing an idle time—capacity model showing a relationship between an idle time when the task performer stops the task performance and an increased amount of the remaining capacity of the battery unit by the recover effect, and,
    the workload calculator configured to calculate based on the current remaining capacity of the battery unit an additional capacity of the battery unit that is additionally necessary when the task performer performs the task during a requested time; search from the idle time—capacity model an idle time corresponding to the calculated additional capacity of the battery unit; and estimate a workload for obtaining the searched idle time to calculate the estimated workload as the necessary workload.

2. The portable device of claim 1, wherein the task performer performs the task per predetermined task performance unit and provides the specific service to the user by repeatedly performing the task and stopping the task performance per predetermined task performance unit.

3. The portable device of claim 1, wherein the workload calculator calculates the necessary workload if a current remaining capacity of the battery unit is larger than the estimated capacity of battery unit to be consumed when the task performer performs the task during the requested time.

4. The portable device of claim 1, wherein the specific service comprises a service of transmitting a coded video to an outside;
    the necessary workload comprises a bitrate that is necessary for transmitting the coded video, and the default workload comprises a default bitrate preset to transmit the coded video;
    the task performer comprises a coder configured to code the video and a transmitter configured to transmit the coded video; and
    the battery unit supplies to the transmitter a power for performing the transmission.

5. The portable device of claim 4, wherein the coder calculates a quantization parameter that is enough to satisfy the bitrate calculated by the workload calculator and codes the video based on the quantization parameter, and
    the transmitter performs the transmission in a unit of group of picture (GOP) and transmits the coded video to an outside by repeatedly transmitting the coded video and stopping the transmission per GOP.

6. The portable device of claim 4, wherein the quality of service comprises a pick signal to noise ratio (PSNR) of the coded video.

7. A method for controlling a portable device including a battery unit, the portable device serving to provide a specific service to a user, the method comprising:
- calculating a workload that is necessary to provide the specific service to the user according to a time request information related to a desired time during which the specific service is provided to the user, the necessary workload being smaller than a default workload that is preset for providing the specific service; and
- performing a task for providing the specific service according to the necessary workload during a time that is reduced to be shorter than a task performance time according to the default workload and stopping the task performance during the reduced time, wherein,
- a remaining capacity of the battery unit is increased due to a recovery effect from a time when the task performer stops the task performance, and the calculating of the workload comprises:
- calculating based on the current remaining capacity of the battery unit an additional capacity of the battery unit that is additionally necessary when the task is performed during a requested time, searching an idle time corresponding to the calculated additional capacity of the battery unit from an idle time—capacity model showing a relationship between an idle time when the task performance is stopped and an increased amount of the remaining capacity of the battery unit by the recovery effect, and estimating a workload for obtaining the searched idle time to calculate the estimated workload as the necessary workload.

8. A portable device for providing a specific service to a user, the portable device comprising:
- a workload calculator configured to calculate a workload that is necessary to provide the specific service to the user according to a time request information related to a desired time during which the specific service is provided to the user and a QoS (Quality of Service) request information related to a quality of the specific service, the necessary workload being smaller than a default workload that is preset for providing the specific service;
- a task performer configured to perform a task for providing the specific service according to the necessary workload during a time that is reduced to be shorter than a task performance time according to the default workload and stop the task performance during the reduced time; and
- a battery unit configured to supply a power for performing the task to the task performer, wherein a remaining capacity of the battery unit is increased due to a recover effect from a time when the task performer stops the task performance,
- wherein the workload calculator comprises a storage unit storing a performance workload—QoS model showing a relationship between a performance workload performed to provide the specific service and a QoS of the specific service according to the performance workload; and an idle time—capacity model showing a relationship between an idle time when the task performer stops the task performance and an increased amount of the remaining capacity of the battery unit by the recovery effect, and,
- the workload calculator configured to search form the performance workload—QoS model a performance workload corresponding to the requested QoS and a search from the idle time—capacity model an increased amount of the remaining capacity of the battery unit corresponding to an idle time obtained by the searched performance workload; estimate an available time of the battery unit by using the searched increased amount of the remaining capacity of the battery unit and a current remaining capacity of the battery unit; and, if the estimated available time of the battery unit is equal to or larger than the requested time, calculate the searched performance workload as the necessary workload.

9. A method for controlling a portable device including a battery unit, the portable device serving to provide a specific service to a user, the method comprising:
- calculating a workload that is necessary to provide the specific service to the user according to a time request information related to a desired time during which the specific service is provided to the user and a QoS request information related to a quality of the specific service, the necessary workload being smaller than a default workload that is preset for providing the specific service; and
- performing a task for providing the specific service according to the necessary workload during a time that is reduced to be shorter than a task performance time according to the default workload and stopping the task performance during the reduce time, wherein,
- a remaining capacity of the battery unit is increased due to a recovery effect form a time when the task performer stops the task performance, and the calculating of the workload comprises:
- searching a performance workload corresponding to the requested QoS form a performance workload—QoS model showing a relationship between a performance workload performed to provide the specific service and a QoS of the specific service according to the performance workload, searching an increased amount of the remaining capacity of the battery unit corresponding to an idle time obtained by the searched performance workload form the idle time—capacity model showing a relationship between an idle time when the task performance is stopped and an increased amount of the remaining capacity of the battery unit by the recovery effect, estimating an available time of the battery unit by using the searched increased amount of the remaining capacity of the battery unit and a current remaining capacity of the battery unit; and
- calculating the searched performance workload as the necessary workload if the estimated available time of the battery unit is equal to or larger than the requested time.

* * * * *